United States Patent
Winsor

(10) Patent No.: US 7,587,893 B2
(45) Date of Patent: Sep. 15, 2009

(54) PARTICULATE FILTER REGENERATION SYSTEM FOR AN INTERNAL COMBUSTION ENGINE

(75) Inventor: Richard Edward Winsor, Waterloo, IA (US)

(73) Assignee: Deere & Company, Moline, IL (US)

(*) Notice: Subject to any disclaimer, the term of this patent is extended or adjusted under 35 U.S.C. 154(b) by 138 days.

(21) Appl. No.: 11/746,667

(22) Filed: May 10, 2007

(65) Prior Publication Data
US 2008/0276603 A1     Nov. 13, 2008

(51) Int. Cl.
*F01N 3/00*     (2006.01)
(52) U.S. Cl. ............................. 60/295; 60/274; 60/280; 60/297; 60/311
(58) Field of Classification Search .................. 60/274, 60/285, 295, 297, 311, 280
See application file for complete search history.

(56) References Cited

U.S. PATENT DOCUMENTS

| | | | | |
|---|---|---|---|---|
| 4,858,825 A | * | 8/1989 | Kawamura | 237/2 A |
| 6,868,668 B2 | * | 3/2005 | Suzuki | 60/286 |
| 7,127,882 B2 | * | 10/2006 | Pfaeffle et al. | 60/285 |

FOREIGN PATENT DOCUMENTS

| | | |
|---|---|---|
| EP | 0211694 | 2/1987 |
| EP | 0445567 | 9/1991 |
| EP | 0942159 | 9/1999 |
| WO | 2007081342 | 7/2007 |

OTHER PUBLICATIONS

Beru:Cold start aids for commercial vehicles. Technical Information No. 01, pp. 8-10. Printed Jan. 8, 2004.

* cited by examiner

Primary Examiner—Thomas E Denion
Assistant Examiner—Diem Tran

(57) ABSTRACT

A particulate filter regeneration system for an internal combustion engine includes a plurality of combustion cylinders, an intake manifold and an exhaust manifold. The particulate filter regeneration system includes a particulate filter adapted for communication with the exhaust manifold, a flame heater adapted for communication with the intake manifold, and a temperature indicator for providing an indication of a temperature associated with the exhaust manifold. A controller is coupled with the temperature indicator and the flame heater. The controller actuates the flame heater dependent upon a particulate filter regeneration indicator and a signal from the temperature indicator indicating a temperature of less than approximately 300° C.

17 Claims, 2 Drawing Sheets

PARTICULATE FILTER REGENERATION SYSTEM FOR AN INTERNAL COMBUSTION ENGINE

FIELD OF THE INVENTION

The present invention relates to internal combustion engines, and, more particularly, to a system and method for regenerating particulate filters used for filtering particulates from an exhaust stream in such an internal combustion engine.

BACKGROUND OF THE INVENTION

In order to meet existing and future particulate emission standards for internal combustion (IC) engines, in particular diesel engines, manufacturers of diesel engines are using particulate filters (PF, also referred to as particulate traps). Such particulate filters are typically placed downstream of the turbocharger turbine and remove solid particulate matter before it exits the exhaust system to the ambient environment. After a particulate filter collects particulates for a period of time, increasing the exhaust temperature to a suitable level (e.g., above a minimum of 600° C.) cleans the filter (also known as regenerating) since the oxygen in the exhaust burns the accumulated carbon in the filter.

Particulate filters for diesel engines are typically relatively large and expensive, and regeneration under light load conditions is problematic because attaining the necessary exhaust temperature is difficult. This high exhaust temperature is typically accomplished by adding fuel to the exhaust of the diesel engine and flowing this mixture through a diesel oxidation catalyst (DOC). However, the mixture temperature entering the DOC has to be a minimum of about 300° C. to ensure good oxidation of the added fuel. Various means of obtaining the necessary 300° C. exhaust temperature at light loads and low ambient temperatures have been proposed and put into production. Methods of increasing exhaust temperature include adding additional load on the engine, retarding injection timing, injecting additional fuel very late in the combustion process, and reducing engine air flow by air system changes such as turbocharger compressor bypass and changing vane settings on variable geometry turbochargers.

What is needed in the art is a system and method of easily increasing the exhaust temperature entering a DOC for effective regeneration of the PF under light loads.

SUMMARY OF THE INVENTION

The invention in one form is directed to an internal combustion engine, including a plurality of combustion cylinders, an intake manifold in communication with at least one of the combustion cylinders, and an exhaust manifold in communication with at least one of the combustion cylinders. A particulate filter is in communication with the exhaust manifold, and a flame heater is in communication with the intake manifold. A controller is coupled with one or more temperature indicators and the flame heater. The controller actuates the flame heater dependent upon a particulate filter regeneration indicator and a signal from at least one temperature indicator.

The invention in another form is directed to a particulate filter regeneration system for an internal combustion engine including a plurality of combustion cylinders, an intake manifold and an exhaust manifold. The particulate filter regeneration system includes a particulate filter adapted for communication with the exhaust manifold, a flame heater adapted for communication with the intake manifold, and a temperature indicator for providing an indication of a temperature associated with the exhaust manifold. A controller is coupled with the temperature indicator and the flame heater. The controller actuates the flame heater dependent upon a particulate filter regeneration indicator and a signal from the temperature indicator indicating a temperature of less than approximately 300° C.

The invention in yet another form is directed to a method of regenerating a particulate filter in an internal combustion engine, including the steps of: providing a particulate filter regeneration indicator; determining that an exhaust temperature is below a predetermined threshold value; and actuating a flame heater to heat intake air associated with an intake manifold, dependent upon each of the particulate filter regeneration indicator and the determined exhaust temperature above the predetermined threshold value.

DETAILED DESCRIPTION OF THE INVENTION

Figure 1:
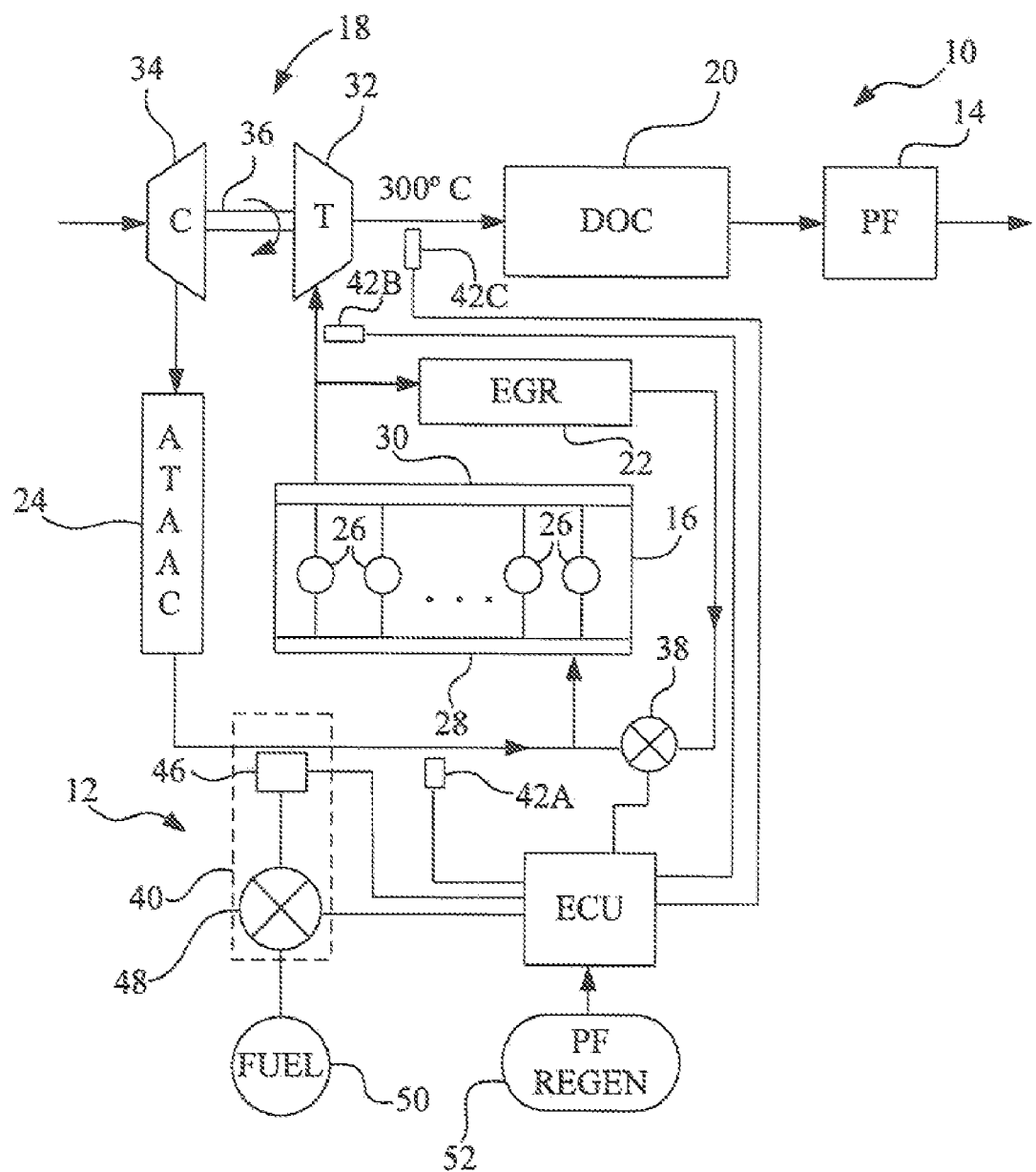
FIG. 1 is a schematic view of an IC engine including an embodiment of a particulate filter regeneration system of the present invention.

Referring now to the drawings, and more particularly to FIG. 1, there is shown an embodiment of an IC engine 10 which includes an embodiment of a particulate filter regeneration system 12 of the present invention for regenerating a particulate filter 14 at selected points in time. IC engine 10 also generally includes an engine block 16, turbocharger 18, DOC 20, EGR system 22 and air-to-air aftercooler (ATAAC) 24.

Engine block 16 includes a plurality of combustion cylinders 26, four of which are shown in FIG. 1 for illustration purposes. The particular number of combustion cylinders 26 can of course vary depending upon the application. Each combustion cylinder 26 is fluidly coupled with an intake manifold 28 and an exhaust manifold 30. In the embodiment shown, a single intake manifold 28 and exhaust manifold 30 are provided; however, it is also to be understood that split manifolds may also be used for a particular application.

Exhaust manifold 30 is fluidly coupled with turbocharger 18, including a turbine 32 which rotatably drives a compressor 34 via a drive shaft 36. Part of the exhaust which is used to drive turbine 32 may be bled off using EGR system 22 for recirculation back to intake manifold 28. To that end, an EGR valve 38 is controllably actuated to control the amount of exhaust which is recirculated to intake manifold 28.

The majority of the exhaust which is not recirculated using EGR system 22 flows through turbine 32 and is discharged to DOC 20. DOC 20 may be of known design, and thus is not described further herein.

Particulate filter 14 is used to filter particulate matter from the exhaust flow prior to being discharged from the ambient environment, and may likewise be of conventional design. Particulate filter 14 may be configured as a single particulate filter or multiple particulate filters, depending upon the application.

Compressor 34 of turbocharger 18 receives combustion air from the ambient environment and compresses the combustion air which is provided to intake manifold 28. The work of compression on the combustion air heats the combustion air, which is then cooled using ATAAC 24 upstream from intake manifold 28.

Particulate filter regeneration system 12 generally includes a flame heater 40, one or more temperature indicators 42 and ECU 44. ECU 44 may take the form of any desired combination of electronic hardware and/or software, depending upon the application. In the embodiment shown, ECU 44 is preferably a microprocessor based ECU for performing the various functionality described hereinafter.

Temperature indicators 42 provide an indication of a temperature associated with exhaust manifold 30. Such indicators may be positioned at the upstream or downstream side of exhaust manifold 30, and can be used to directly or indirectly determine the temperature of the exhaust. For example, in the embodiment shown, one temperature indicator 42A is provided at the upstream side of intake manifold 28, another temperature indicator 42B is provided between exhaust manifold 30 and the inlet to turbine 32, and yet another temperature indicator 42C is provided between turbine 32 and the inlet of DOC 20. Temperature indicators 42 are preferably in the form of temperature sensors which may be used to directly determine the temperature of a passing fluid, such as the combustion air on the upstream side of intake manifold 28 or exhaust on the downstream side of exhaust manifold 30. Alternatively, temperature indicators 42 may be in the form of another type of sensor which can provide an indirect indication of the temperature at selected points along the flow path of the combustion air and/or exhaust. For example, temperature indicators 42 may also be in the form of pressure sensors from which a corresponding temperature of the fluid may be calculated. Temperature indicators 42 are coupled with and provide input signals to ECU 44 via corresponding electric lines, but could also be wirelessly coupled with ECU 44.

Flame heater 40 is in fluid communication with the compressed combustion air on the upstream side of intake manifold 28, and is used to selectively heat the intake air to a desired temperature, thereby in turn raising the temperature of exhaust flowing to DOC during a regeneration mode of particulate filter 14. Flame heater 40 includes a glow plug 46 and a selectively actuated valve 48 which controls a flow of fuel used to generate an open flame for heating the compressed combustion air. Valve 48 is fluidly coupled with and receives fuel from a fuel source 50, such as an onboard diesel fuel tank on a vehicle. Fuel source 50 may be separate from or the same as the fuel source supplying fuel to combustion cylinders 26, and also may be the same or a different type of fuel than that supplied to combustion cylinders 26. Valve 48 is likewise electrically coupled with ECU 44 for controllable actuation during operation.

Glow plug 46 is typically first turned on for a predetermined period of time prior to opening valve 48 for injection of the fuel for the open flame. Glow plug 46 is electrically coupled with and controllably actuated by ECU 44 as shown. Glow plug 46 may also be controllably actuated to be used as a standard glow plug during engine startup at cold ambient temperatures. Such flame heaters are known for use at engine start-up to increase the intake manifold temperature to allow starting of the diesel engine in cold ambient conditions. For example, Beru Aktiengesellschaft, Ludwigsburg, Germany, and others have made flame heaters for use at engine startup which may be used as a heat source with the particulate filter regeneration system of the present invention. (see, e.g., htt:/www.beru.com/english/produkte/flammstartsystem.php).

ECU 44 is also coupled with a particulate filter regeneration indicator 52 used as an input for initiating a regeneration cycle for particulate filter 14. PF regen indicator 52 typically is a separately determined function, such as by using a timed based indicator flag corresponding to the number of hours of engine operation since a last regeneration of particulate filter 14. Alternatively, PF regen indicator 52 can be integrally incorporated into the logic of ECU 44.

Figure 2:
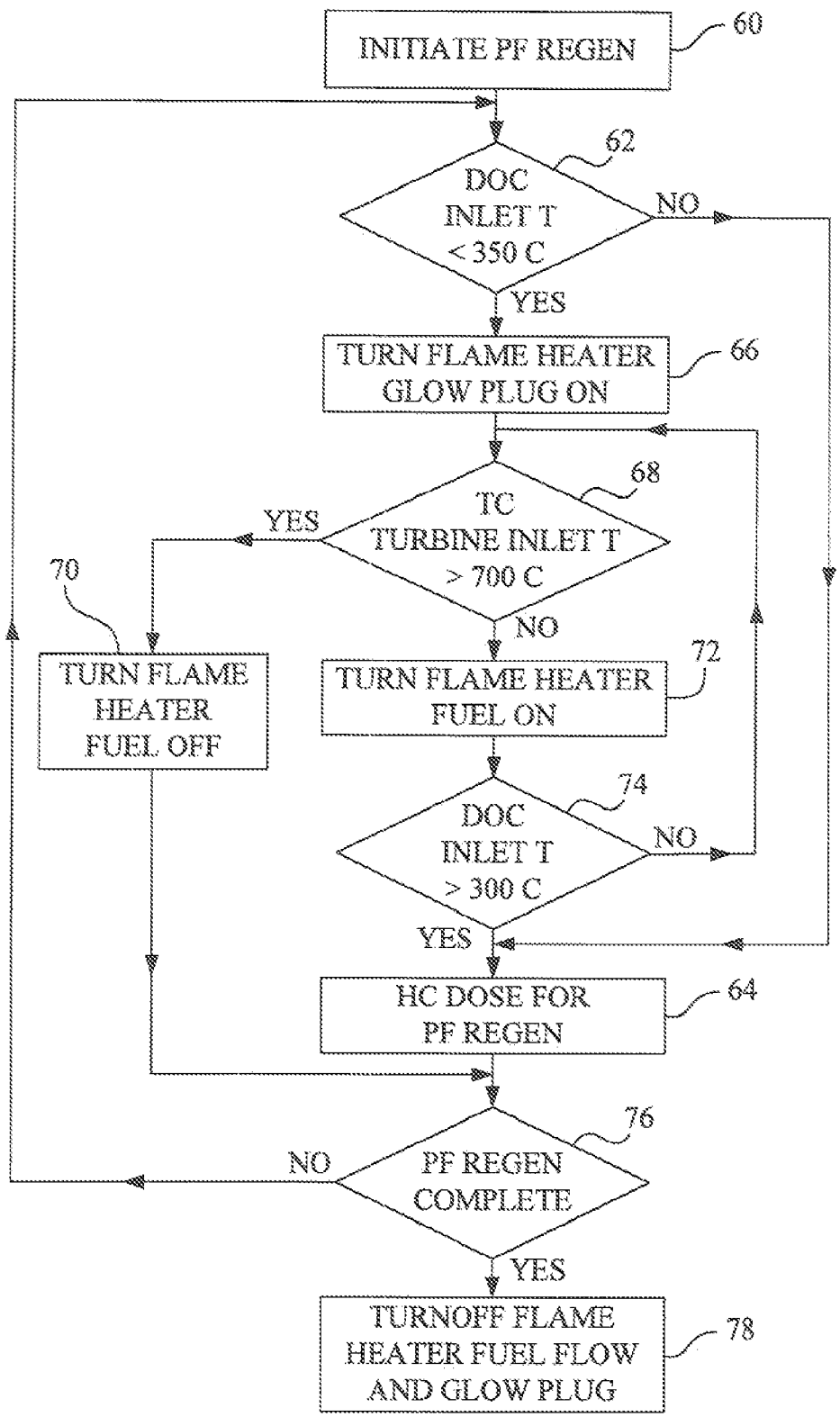
FIG. 2 is a flowchart illustrating an embodiment of the control logic for the particulate filter regeneration system shown in FIG. 1.

Referring now to FIG. 2, there is shown a flow chart which will be used to describe the control logic for particulate filter regeneration system 12 of the present invention. At start block 60, the particulate filter regeneration is initiated using PF regen indicator 52. At decision block 62, if the inlet temperature of the exhaust at DOC 20 is greater than 350° C. (NO), then the temperature is already high enough for hydrocarbon dosing for regeneration of PF filter 14 and control logic passes directly to block 64. Otherwise, if the temperature of the exhaust entering DOC 20 is less than 350° C. (YES), then the glow plug 46 of flame heater 40 is turned on (block 66).

At decision block 68, the temperature at the inlet to turbine 32 is sensed using sensor 42B. If the exhaust temperature at the inlet to turbine 32 is greater than 700° C., then a max exhaust temperature already exists and the fuel flow to flame heater 40 is either turned off or maintained off by placing valve 48 in the closed position (block 70). Alternatively, if the exhaust temperature at the inlet to turbine 32 is not greater than 700° C. (decision block 68, NO), then valve 48 is opened to allow fuel to flow to the termination at glow plug 46, resulting in an open flame for heating the compressed combustion air to intake manifold 28 (block 72). Flame heater 40 increases the temperature of the intake air to intake manifold 28 at least 100° C., preferably approximately 200° C. If the exhaust inlet temperature to DOC 20 is greater than 300° C. (decision block 74, YES), then hydrocarbon dosing within DOC 20 occurs for regeneration of particulate filter 14. Otherwise, if the exhaust temperature at the inlet to DOC 20 is less than 300° C. (NO), then control loops back to the input side of decision block 68 and the fuel flow to flame heater 40 is maintained in the ON position.

After hydrocarbon dosing within DOC 20 occurs for regeneration of particulate filter 14, a decision is made as to whether the regeneration of particulate filter 14 is complete (decision block 76). If the regeneration is not complete, then the control logic loops back to the input side of decision block 62 and the process repeats. Otherwise, if the regeneration of particulate filter 14 is complete (YES), then ECU 44 turns off glow plug 46 and closes valve 48 for termination of the regeneration control logic (block 78).

Having described the preferred embodiment, it will become apparent that various modifications can be made without departing from the scope of the invention as defined in the accompanying claims.

The invention claimed is:

1. An internal combustion engine, comprising:
a plurality of combustion cylinders;
an intake manifold in communication with at least one of said plurality of combustion cylinders;
an exhaust manifold in communication with at least one of said plurality of combustion cylinders;
a particulate filter in communication with said exhaust manifold;
a diesel oxidation catalyst (DOC) positioned between said exhaust manifold and said particulate filter:
a flame heater in communication with said intake manifold;
at least one temperature indicator in communication with an inlet side of said DOC;
a controller coupled with each said temperature indicator and said flame heater, said controller actuating said flame heater dependent upon a particulate filter regeneration indicator and a signal from at least one of said temperature indicator; and a turbocharger with a turbine in communication with said exhaust manifold, and wherein another said temperature indictor is in communication with an inlet side of said turbine.

2. The internal combustion engine of claim 1, including a turbocharger and an aftercooler in communication with said intake manifold, said flame heater being positioned between said aftercooler and said intake manifold.

3. The internal combustion engine of claim 1, wherein said flame heater includes a glow plug heater.

4. The internal combustion engine of claim 1, wherein said flame heater increases a temperature of exhaust at an inlet to said DOC to at least 300° C.

5. The internal combustion engine of claim 1, wherein said flame heater increases a temperature of intake air to said intake manifold at least 100° C.

6. The internal combustion engine of claim 5, wherein said flame heater increases a temperature of intake air to said intake manifold approximately 200° C.

7. The internal combustion engine of claim 1, wherein at least one said temperature indicator includes a sensor from which a temperature can be one of directly and indirectly determined.

8. The internal combustion engine of claim 7, wherein said sensor includes one of a temperature sensor and a pressure sensor.

9. A method of regenerating a particulate filter in an internal combustion engine, comprising the steps of:

providing a particulate filter regeneration indicator;

determining that an exhaust temperature is below a predetermined threshold value;

actuating a flame heater to heat intake air associated with an intake manifold, dependent upon each of said particulate filter regeneration indicator and said determined exhaust temperature below said predetermined threshold value; and determining an exhaust temperature at an inlet of a turbocharger turbine; and deactuating a fuel flow to said flame heater if said determined exhaust temperature at said inlet of said turbocharger turbine is greater than approximately 700° C.

10. The method of regenerating a particulate filter of claim 9, wherein said predetermined threshold value is 300° C.

11. The method of regenerating a particulate filter of claim 9, including the step of reactuating said fuel flow to said flame heater if said determined exhaust temperature at said inlet of said turbocharger turbine falls below approximately 300° C.

12. The method of regenerating a particulate filter of claim 9, wherein said flame heater increases a temperature of intake air to said intake manifold at least 100° C.

13. The method of regenerating a particulate filter of claim 12, wherein said flame heater increases a temperature of intake air to said intake manifold approximately 200° C.

14. The method of regenerating a particulate filter of claim 9, including a DOC positioned between said exhaust manifold and said particulate filter.

15. The method of regenerating a particulate filter of claim 14, wherein said flame heater increases a temperature of exhaust at an inlet to said DOC to at least 300° C.

16. The method of regenerating a particulate filter of claim 9, wherein said step of determining said exhaust temperature is carried out using at least one sensor from which a temperature can be one of directly and indirectly determined.

17. The method of regenerating a particulate filter of claim 16, wherein said sensor includes one of a temperature sensor and a pressure sensor.

* * * * *